No. 786,211. PATENTED MAR. 28, 1905.
C. L. GROHMANN.
LINOTYPE MACHINE.
APPLICATION FILED NOV. 12, 1904.
7 SHEETS—SHEET 1.
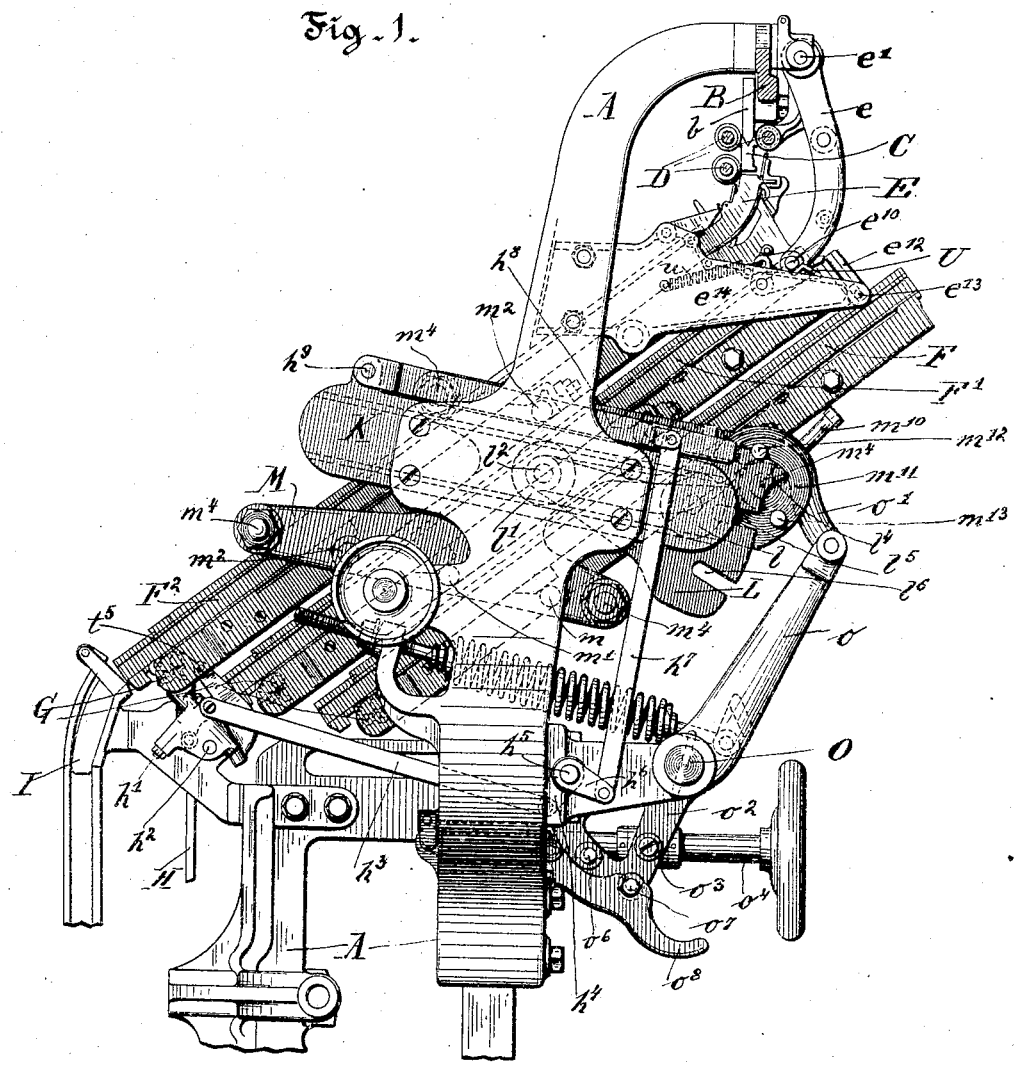

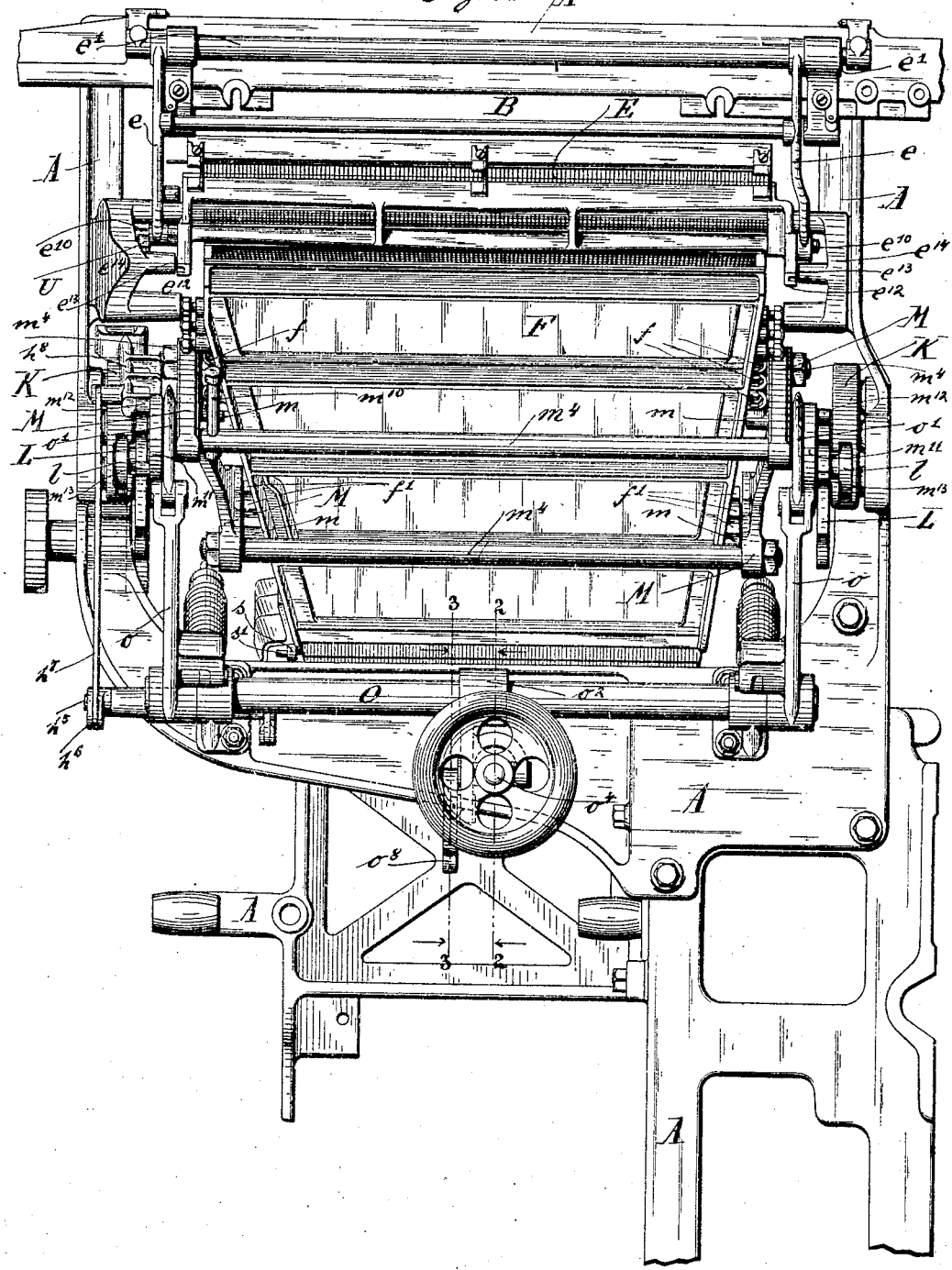

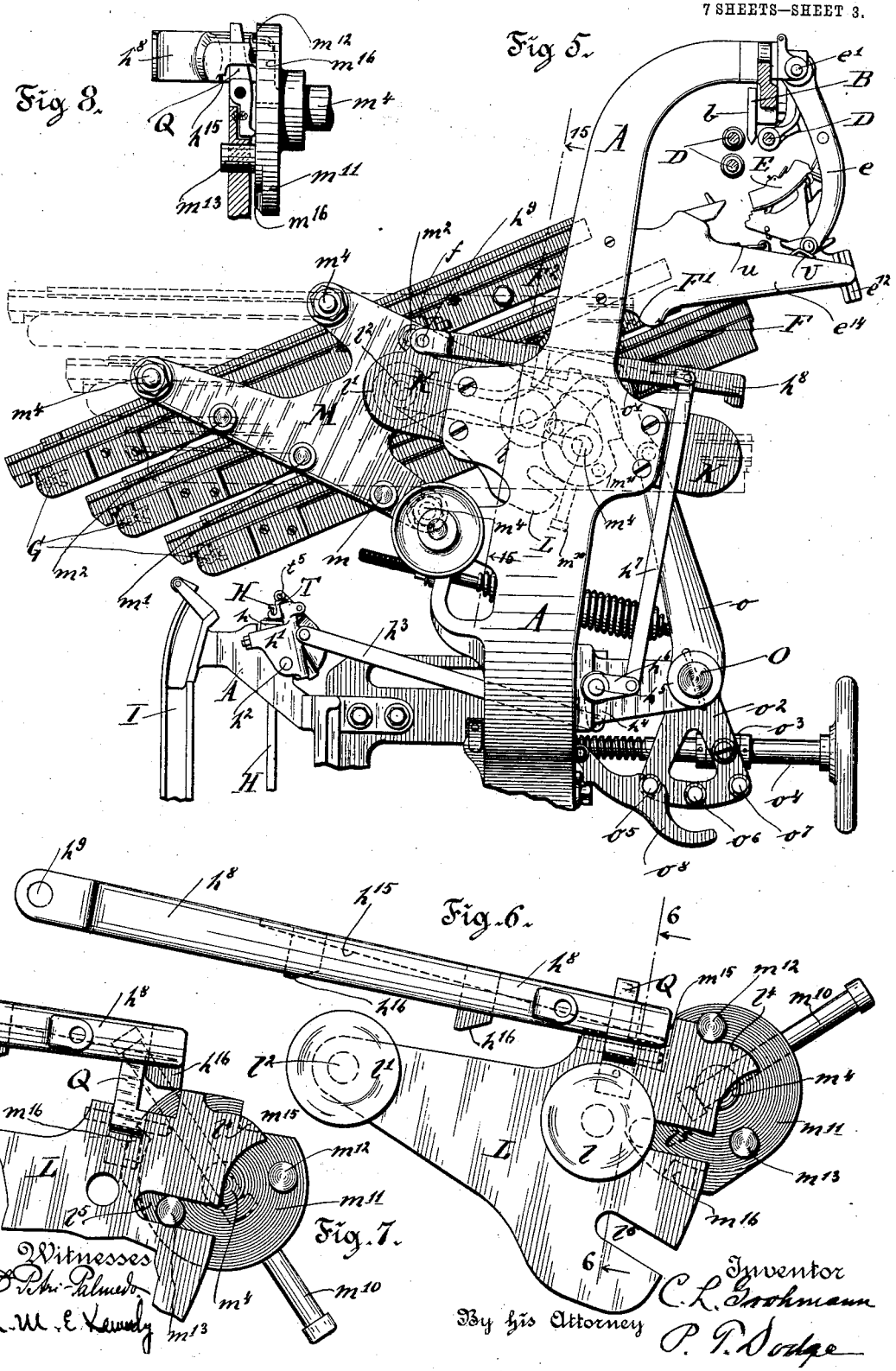

No. 786,211. PATENTED MAR. 28, 1905.
C. L. GROHMANN.
LINOTYPE MACHINE.
APPLICATION FILED NOV. 12, 1904.
7 SHEETS—SHEET 4.
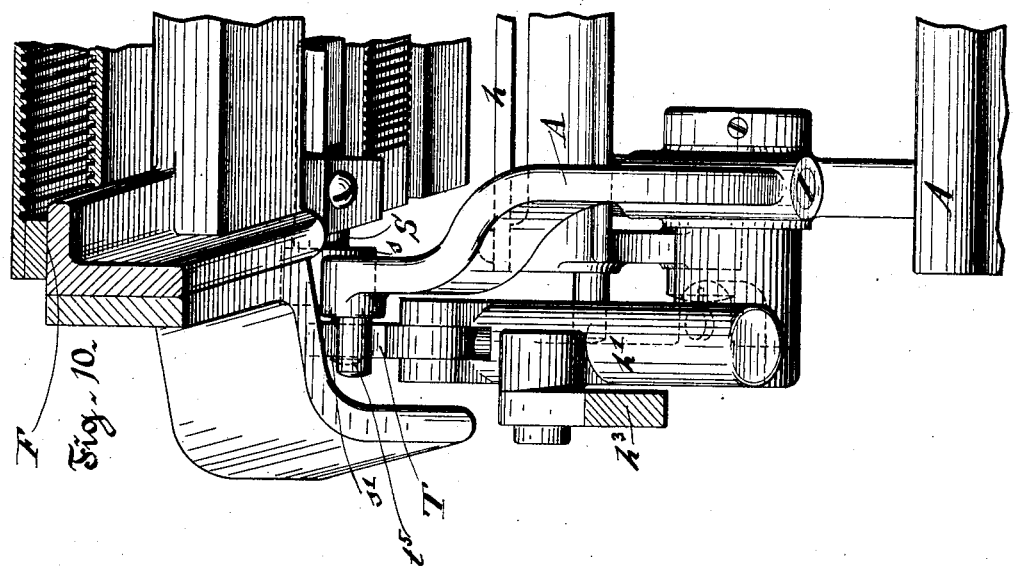
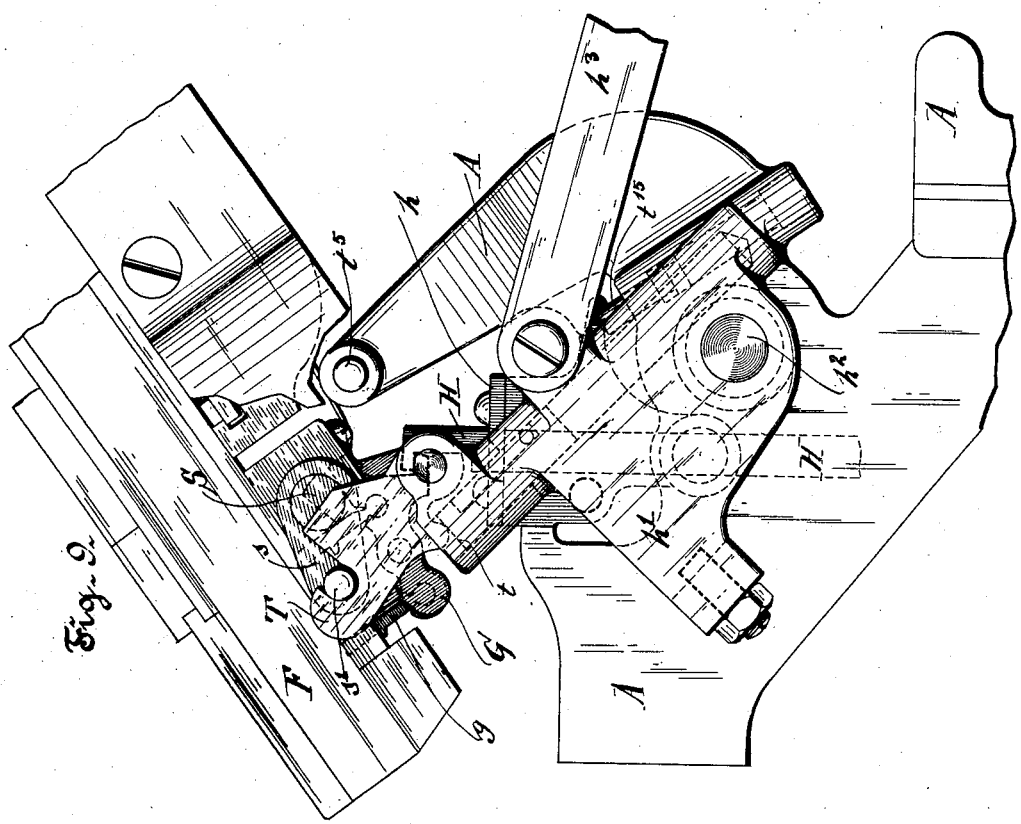

No. 786,211. PATENTED MAR. 28, 1905.
C. L. GROHMANN.
LINOTYPE MACHINE.
APPLICATION FILED NOV. 12, 1904.
7 SHEETS—SHEET 5.
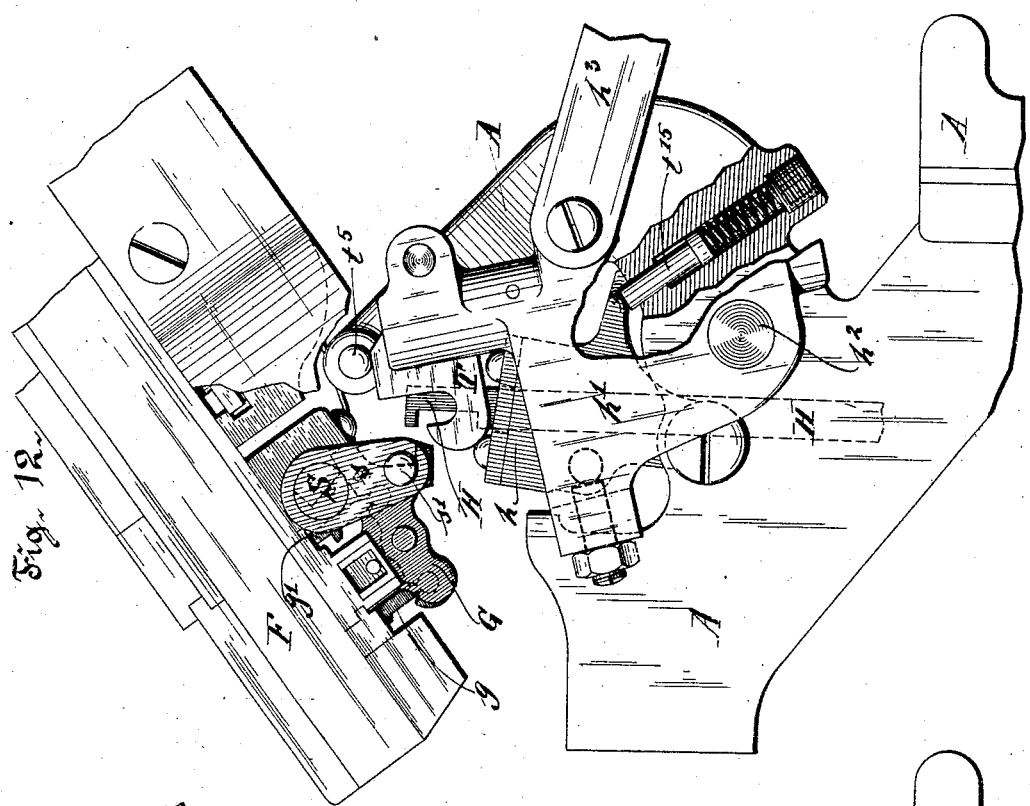
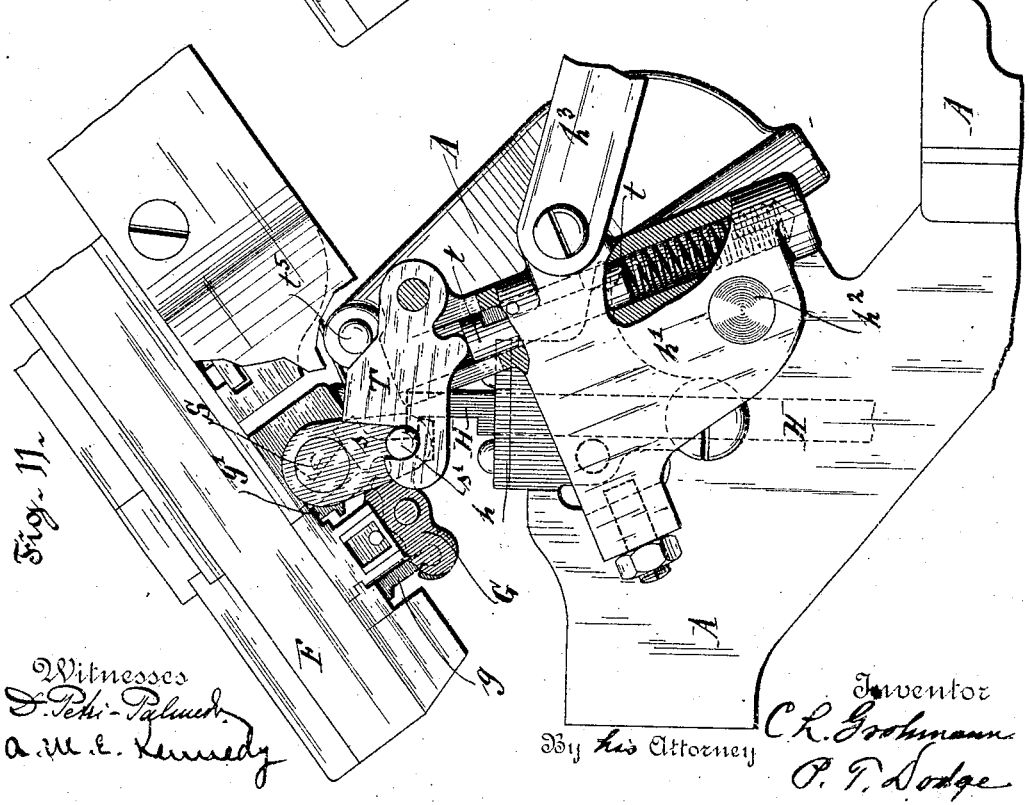

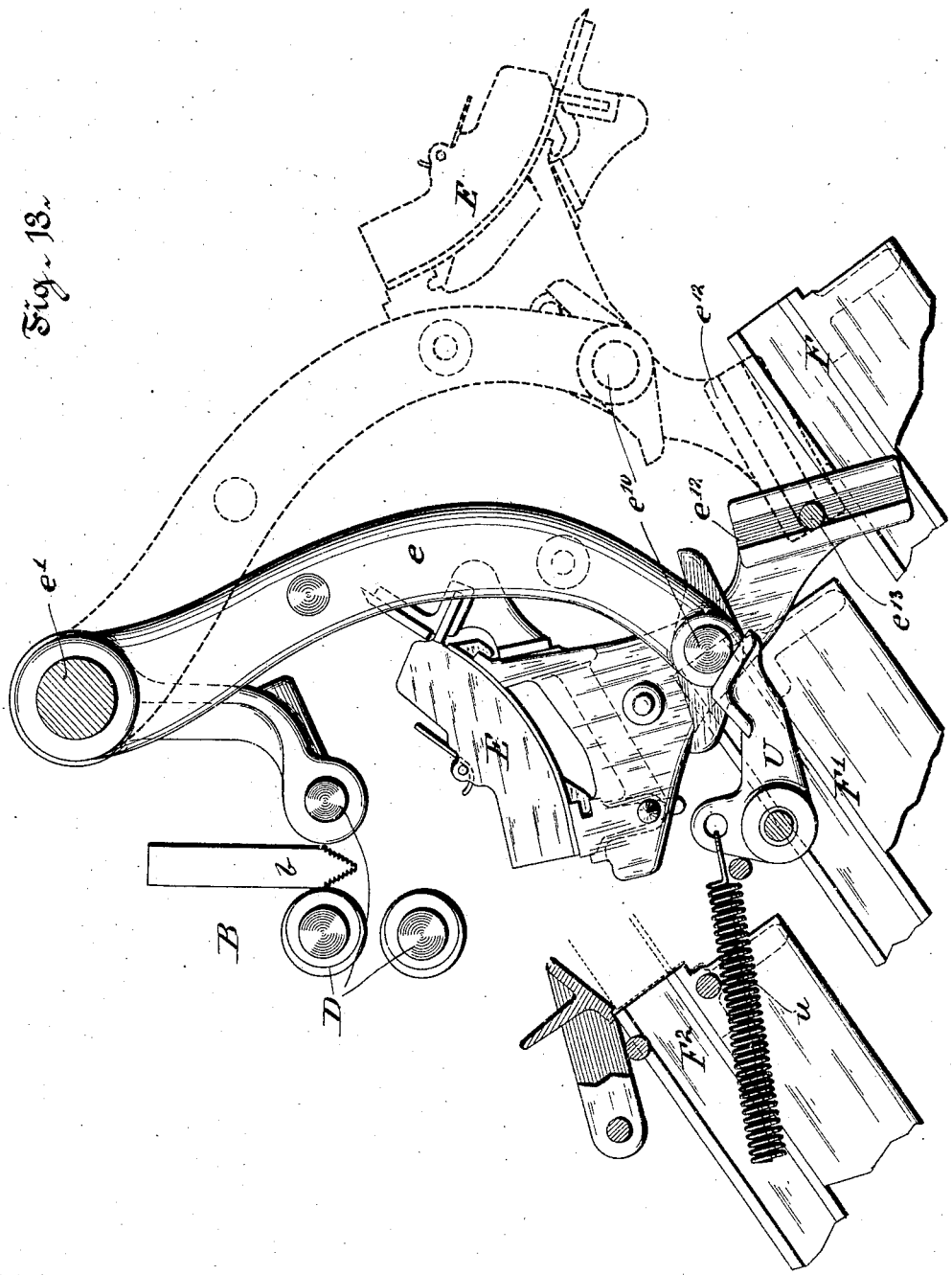

No. 786,211. PATENTED MAR. 28, 1905.
C. L. GROHMANN.
LINOTYPE MACHINE.
APPLICATION FILED NOV. 12, 1904.

7 SHEETS—SHEET 7.

Witnesses
Inventor
C. L. Grohmann
By his Attorney
P. T. Dodge

No. 786,211.  
Patented March 28, 1905.

UNITED STATES PATENT OFFICE.

CARL L. GROHMANN, OF BROOKLYN, NEW YORK, ASSIGNOR TO MERGENTHALER LINOTYPE COMPANY, A CORPORATION OF NEW YORK.

LINOTYPE-MACHINE.

SPECIFICATION forming part of Letters Patent No. 786,211, dated March 28, 1905.

Application filed November 12, 1904. Serial No. 232,453.

*To all whom it may concern:*

Be it known that I, CARL L. GROHMANN, of Brooklyn, county of Kings, and State of New York, have invented a new and useful Improvement in Linotype-Machines, of which the following is a specification.

This invention has reference more particularly to Mergenthaler linotype-machines of the general organization represented in Letters Patent of the United States Nos. 436,532 and 557,000, wherein individual matrices stored in a magazine are released by finger-keys in the required order, assembled in line, and presented to close the face of a slotted mold, in which a printing-slug or linotype is cast, after which the matrix-line is elevated and the matrices returned by a distributing mechanism to the magazine-channels from which they started.

The aim of the invention is to provide the machine with a number of magazines, each containing a font or set of matrices and so arranged that either one of the magazines and its matrices may be brought into operative relation to the other part of the machine at will.

To this end it consists in combining with two or more magazines, one overlying another and each preferably provided with its own matrix-releasing devices, supporting and adjusting mechanisms by which the magazines may be easily and quickly unlocked, adjusted in the required position, and relocked.

With the exception of the parts hereinafter described and specifically claimed the machine may be of the same construction as the commercial linotype of the present day or of any equivalent construction.

I have confined the drawings to the magazines and attendant parts to which my invention relates.

Figure 14:
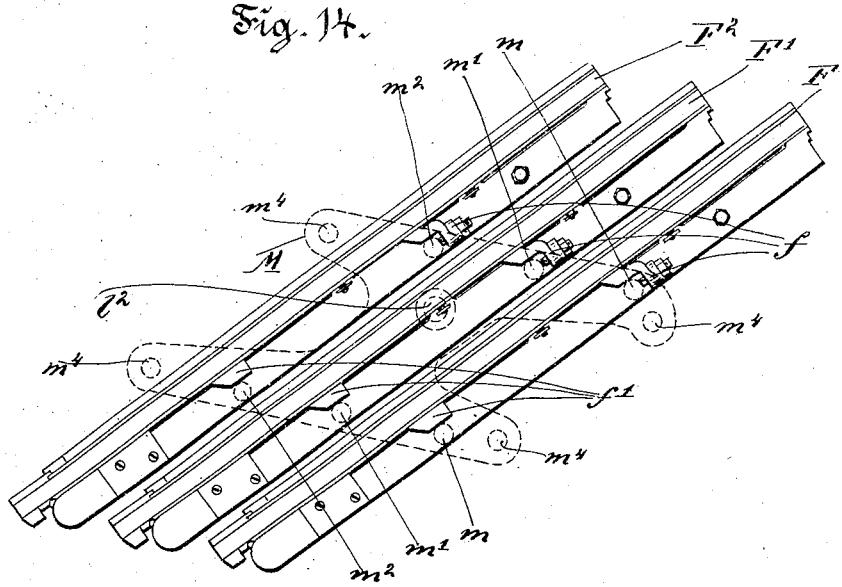
Figure 15:
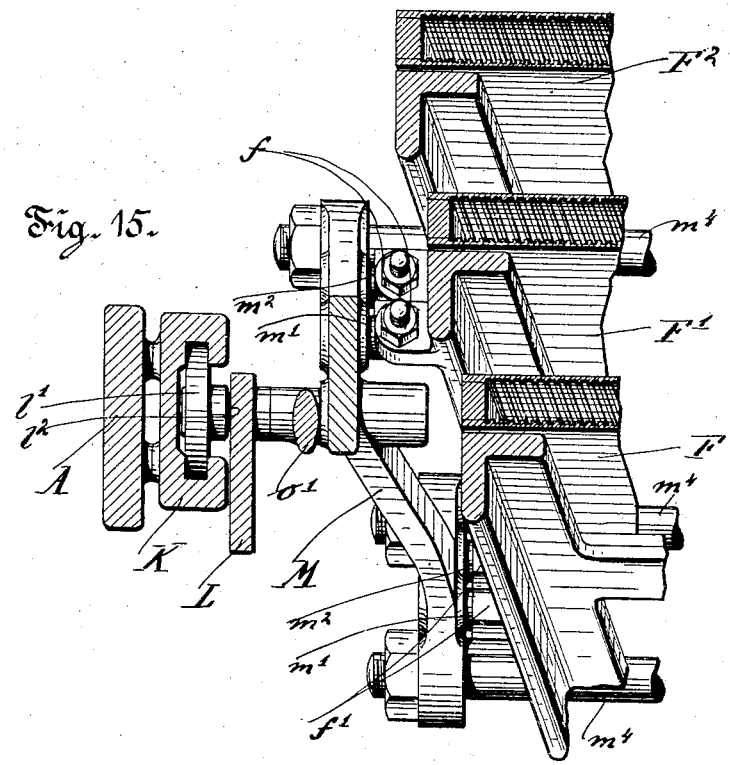

Figure 1 is a side elevation of the upper part of a machine in accordance with my invention containing three magazines, the upper magazine being in operative position. Figs. 2 and 3 are vertical sections in a fore-and-aft direction on the correspondingly-numbered lines of Fig. 4, showing in part devices for moving and locking the magazines. Fig. 4 is a rear elevation of the parts shown in Fig. 1. Fig. 5 is a side elevation similar to Fig. 1, but with the magazines released and at an intermediate stage of adjustment. Fig. 6 is a side elevation of lever connections for moving and locking the parts. Fig. 7 is a side view of the same parts in a different position. Fig. 8 is a view of the same parts looking in the direction of the arrow No. 8 in Figs. 6 and 7. Fig. 9 is a side elevation, on an enlarged scale, showing devices for locking the matrices, discharging the escapements, and for controlling the key-rods through which they are actuated. Fig. 10 is a rear elevation of the same parts, portions being broken away. Fig. 11 and Fig. 12 are views of the parts shown in Fig. 9 in different stages of adjustment. Fig. 13 is a side elevation showing the upper ends of the magazines, the channel throat-plate or entrance, and adjacent parts. Fig. 14 is a side view of the magazines, together with an outline of the rocker-frame supporting them. Fig. 15 is a partial section on line 15 15 of Fig. 5.

Referring to the drawings, A represents the upper portion of the rigid main frame, which may be of any suitable form and construction, provided it is adapted to sustain the operative parts hereinafter described.

B is the horizontal distributer-bar fixed transversely across the top of the machine for the purpose of receiving the matrices from the composed line and returning them to the upper ends of the magazine-channels in the usual way. This distributer may be of any form; but as shown in the drawings it is of the ordinary Mergenthaler type consisting of the bar *b*, having its lower edge, of V form, provided with longitudinal permuted teeth to engage corresponding teeth in the upper end of the matrices C and hold them in suspension until they arrive over their respective channels, the movement being effected, as usual, by longitudinal carrier-screws D, lying adjacent to the distributer-bar and engaging the edges of the matrices.

E is a vertically-channeled throat-plate or magazine-entrance lying below the distributer-bar in position to receive the matrices falling therefrom and direct them downward and forward into the upper end of the magazine which is for the time being in action. This entrance is carried on the lower ends of arms e, having their upper ends connected to the main frame by horizontal pivots $e'$, so that the throat or entrance may be thrown backward, as shown in Figs. 5 and 13, away from the magazines when the latter are to be adjusted.

F, F', and $F^2$ represent the series of matrix-containing magazines, three in number in the present instance. These magazines consist, as usual, each of two parallel top and bottom plates, grooved longitudinally in their inner or opposing faces to receive and guide the ears of the matrices, which entering at the top slide downward step by step until they are released at the lower end and permitted to pass to the line in course of composition. Each magazine is provided at the lower end with the usual escapement mechanism G for each channel for releasing the matrices one at a time that they may escape from the lower end and pass to the line. In the form shown this escapement mechanism consists, as usual, of a centrally-pivoted lever having at opposite ends the two pawls $g$ and $g'$, which are projected upward alternately from the bottom of the magazine into the path of the matrices. When the parts are in operative position, each escapement is engaged at the rear end, as shown in Fig. 9, by a vertically-guided rod or bar H, connected at its lower end with finger-key mechanism of any suitable character, the action of these parts being hereinafter described in detail.

I represents a vertically-channeled assembler or front plate into the upper end of which the released matrices are delivered from the magazine, as usual, so that they may descend therethrough to the carrier-belt and the usual coöperating devices for assembling the matrices side by side in line in the order in which their characters are to appear in print.

The present invention has reference more particularly to the manner of sustaining and adjusting the magazines F F', &c., so that either one of the series may be brought at will into operative relation to the distributing devices at the upper end and the assembler I at the lower end.

In Fig. 1 the upper magazine $F^2$ is shown in operative position. When either of the other magazines is to be brought into use, the magazine $F^2$ must be moved out of the position shown in Fig. 1 and its place taken by the one to be used. This is accomplished as follows: To each side of the main frame A, I secure rigidly on the inner side adjacent to the magazines a track-plate K of the form shown in Fig. 15, having in its inner face a straight track or groove having a slight downward inclination to the rear. I also provide on each side of the machine a sliding plate L, such as shown in detail in Fig. 6, having on the outer side two horizontal rollers $l\ l'$, mounted to travel forward and backward in the track-plate K. I further provide in opposite sides of the machine the two vertical rocker-plates M, which directly support the magazines. These plates are sustained on the respective studs or pivots $l^2$ of the rollers $l'$, so that the plates M are carried forward and backward with the plate L, but permitted an independent rocking motion in a vertical plane. Each plate M is provided with three pairs of studs $m$, $m'$, and $m^2$, each pair intended to sustain the adjacent edge of one magazine. The magazines are each provided, as shown in Figs. 1, 4, and 14, in opposite edges with two pairs of shoulders $f$ and $f'$, intended to engage over the studs of the adjacent plate M in order to sustain the magazine thereon. It will thus be seen that each magazine is sustained at opposite edges by its shoulders $f$ and $f'$ resting on the studs of the adjacent rocker-plates M, which are free to rock on their horizontal pivots and also to move forward and backward with the sliding plates L. Thus it will be seen that the three magazines are rigidly sustained in fixed relations to one another, while being permitted to tip around the horizontal axes and also to move bodily forward and backward. The tipping or rocking motion is for the purpose of throwing the upper end of the operative magazine away from the distributing mechanism and its lower end upward clear of the assembler I and the escapement-actuating rods H, as shown in Fig. 5, so that the magazines may be moved forward or backward and then tipped to their original position to bring the selected magazine into operative position. The rocker-frames M are preferably connected by the four tie-rods $m^4$, extending across the machine and constituting, in connection with the plates, a stiff or rigid frame in which the magazines may be firmly sustained and kept in proper relations with one another.

The magazines mounted as above may be tilted and moved forward and backward by hand; but in order to reduce the time required and secure positive movements of the parts I provide the following parts: A transverse rock-shaft O is seated in bearings in the rear side of the main frame and provided with two arms $o$, extended upward at opposite sides of the machine and connected by curved links $o'$ to the pivots $l^2$ of the sliding plates L, as shown in Figs. 1, 4, 5, and 15. The shaft O is provided at the middle with a depending arm or sector $o^2$, carrying a sleeve $o^3$, seated between collars on the horizontal hand-screw $o^4$, the inner end of which is seated in the main frame, as shown in Figs. 1, 2, 3, and 5. When the screw is turned, it has the effect of rocking the shaft O and arms $o$, thereby causing the links $o'$ to shift the magazines bodily forward or backward, so that one or another may be rocked into operative position. The shaft arm or segment $o^2$ is provided with three studs $o^5$, $o^6$, and $o^7$, representing the three magazines, and the main frame is provided with a pivoted spring-actuated latch $o^8$, notched in its upper edge to engage one or another of the studs, and thus lock the slide-frame L and the magazines in either one of the three positions, according as one magazine or another is to be adjusted for use.

Preparatory to the shifting of the magazines it is necessary that the escapement-actuating rods H shall be unhooked from the escapements of the magazine in action and held back until the next magazine is in operative position. To this end the rods H are extended at their upper ends through a guide-plate $h$, secured to a rocking frame $h'$, mounted on a horizontal shaft or axis $h^2$ in the main frame, as shown in Figs. 1, 5, 9, 10, 11, and 12. The rocking frame $h'$ is connected by link $h^3$ to arm $h^4$ on a rock-shaft $h^5$, which is seated in the main frame and provided with a second arm $h^6$, which is in turn connected by a link $h^7$ to a long arm or lever $h^8$, connected at its forward end by pivot $h^9$ to the fixed plate K. When the arm $h^8$ is raised, it acts, through the intermediate connections, to rock the frame $h'$ backward, and thus at one action disengage all the actuating-bars H from the escapements, as shown in Fig. 12. The movement of the arm $h^8$ to disengage the key-rods H is effected prior to the shifting of the magazines by devices shown in Figs. 1, 6, 7, and 8.

The upper rear tie-rod $m^4$, connecting the rocker-plates M, as before described, is mounted to rotate and is provided with a handle $m^{10}$ for turning it and with disks $m^{11}$, carrying two studs $m^{12}$ and $m^{13}$ to engage the rear end of the adjacent slide-plate L. It will be remembered that the slide-plates L have only a forward-and-backward motion, while the rocker-frame M turns vertically around its pivot in relation to the slide-frame.

The slide-frames L are each provided at the rear end with a shoulder $l^4$ and the notches $l^5$ and $l^6$. When their parts are in their normal position and the magazine in action, the studs $m^{12}$ bear on the shoulders $l^4$, thus holding the disks and their shaft $m^4$ in an elevated position, the shaft in turn holding up the rear end of the rocker-frame M, so that the magazines are maintained at their operative inclination. When, however, the handle $m^{10}$ is turned downward and the disks $m^{11}$ rotated, the stud $m^{12}$ is carried away from the shoulder $l^4$ and the stud $m^{13}$ at the same time caused to enter the slot $l^5$, as shown in Fig. 8, the effect being to carry the shaft $m^4$ and the rear end of the rocker-frame M, in which it is mounted, downward, so that the magazines are tipped upward at the front ends and downward at the rear ends, as shown in Fig. 5, in which position they may be slid forward or backward preparatory to bringing a new magazine into action. It is sometimes desirable to inspect the interior of the magazines from end to end and to brush them out. For this purpose it is convenient to have them placed in a horizontal position, as indicated in Fig. 5. This may be effected by turning the handle $m^{10}$ still further, so that the stud $m^{13}$ will carry down the shaft $m^4$ and the rear end of the rocker-frame M the required distance.

It will be seen that the rocking motion of the magazines is controlled by the handle $m^{10}$ and the to-and-fro motion by the screw $o^4$.

One of the disks $m^{11}$ is provided, as shown in Figs. 6, 7, and 8, with a notch or indentation $m^{15}$. When the disks are turned to set the magazines at the operative inclination, the notch $m^{15}$ is in such position that the arm $h^8$, controlling the escapements, is permitted to fall and allow the rocking of the frame $h'$ and the engagement of the rods H. When the disk $m^{11}$ is turned to change the inclination of the rocker-frame and magazines, the shoulder $m^{15}$ as the first action lifts the arm $h^8$ to the position shown in Fig. 8, thereby pulling the escapement-rods H out of action in the manner before described. In order to sustain the arm $h^8$ and hold the escapement-rods out of engagement during the shifting movement of the magazines, the sliding plate L is provided with an upright spring-actuated latch Q, which rides beneath the longitudinal flange $h^{15}$ on the arm $h^8$, as shown in Fig. 8, so as to sustain this arm while the slide-frames and magazines are moving forward and backward. It will be noted that as the magazines are shifted the slide-frames L move forward and backward in relation to the arm $h^8$ and that consequently the lifting-shoulder $m^{15}$ on the disk will act on the arm $h^8$ at one point or another in its length, according as one or another of the magazines is in operative position. The arm $h^8$ is therefore provided, as shown in Figs. 6, 8, &c., at different points in its length with shoulders $h^{16}$, one or another of which will be acted upon by the shoulder of the disk, according to the position of the magazines and slide-plates.

When a new magazine is rocked into position, it is necessary that the arm $h^8$ should be released and permitted to fall in order that the escapement-rods H may reëngage the escapements G. This is effected by providing the disk $m^{11}$ with a shoulder $m^{16}$, as shown in Figs. 6, 7, and 8, to act on the lower end of the sustaining dog or latch Q in order to throw its upper end from under the arm $h^8$ when the disks $m^{11}$ are turned forward to rock either one of the magazines into position.

In order to prevent the escape of matrices from the magazines which are not in use, I provide an automatic locking mechanism for the escapements. Each magazine is provided in the under side with a transverse rock-shaft S, overlying the rear ends of the escapements G and flattened or grooved on one side, so that when turned over to the position shown in Figs. 11 and 12 it will lock all the escapements and when turned over to the position shown in Fig. 9 it will release the escapements and permit their operation in the usual manner. This rock-shaft is substantially the same in arrangement and action as that shown in United States Patent to Bates, No. 719,422. To the end of each rock-shaft I attach a crank-arm $s$, having in its outer end a stud $s'$, and for the purpose of automatically turning these cranks to lock and unlock the escapements I pivot to the rocking frame $h'$ (see Figs. 5, 9, 10, 11, and 12) a hook T, urged upward and backward, as shown in Fig. 11, by a spring-actuated bolt $t$. It will be remembered that the rocking frame $h'$ carries the guide for the upper end of the escapement-actuating bars H. When this frame is rocked backward, as previously described, to disengage the bars H preparatory to the movement of the magazine, the hook T, engaged with the stud of the crank $s$, turns the latter backward, as shown in Figs. 11 and 12, thereby turning the bar S to the position for locking the escapements. When the magazine is shifted, the crank disengages from the hook T, which underrides a fixed stud $t^5$, and when another magazine is rocked into position its crank in turn engages the hook, and after the magazine is in position the forward motion of the rocker-frame $h'$ by the spring-actuated bolt $h^{15}$, Fig. 12, causes the engagement of the bars H with the escapements and also turns the crank and locking-shaft S to release the escapements, thus leaving the parts in operative condition.

Referring again to the channeled throat or entrance E at the upper end of the magazine, the details are illustrated in Figs. 1, 4, 5, and 13. The channeled plate is pivoted to the lower ends of the supporting-arms $e$ at $e^{10}$, so that it may rock or tip backward to give access to the upper end of the magazine when required. When the parts are in operative position, the throat-plate E, which interlocks at the end of the magazine, is held in place by an arm U, pivoted to the main frame and acted upon by a spring $u$. The outer end of this arm U is of $\Lambda$ form, so that in its normal position it bears outside of the pivot $e^{10}$, as shown in Fig. 1, thus keeping the parts in place. When, however, the escapement-throat is turned back and its sustaining-arms $e$ swung rearward, the pivot $e^{10}$ is carried to the outer side of the flange or lever U, as shown in Fig. 13. During the shifting movement of the magazines it is necessary that the throat E and its adjuncts should be held back away from the ends of the moving magazines. For this purpose I provide the end castings of the throat-plate with arms $e^{12}$, Figs. 1 and 13, which are slotted and arranged to ride upon studs $e^{13}$ on the ends of rigid arms $e^{14}$, forming part of the main frame. When, therefore, the throat-plate is turned backward around the pivot $e^{10}$, the arms $e^{12}$ ride on the studs $e^{13}$, causing the sustaining-arm $e$ to swing backward, with the throat-plate, to the position shown in Fig. 13, in which position it is held by the pivots $e^{10}$, resting against the outer side of the flanges of levers U. The throat-plate may be swung still farther to a position shown in dotted lines in Fig. 13 for the purpose of inspection, in which position the parts remain by reason of the overbalancing weight of the throat-plate.

The operation of my mechanism is as follows: Assuming the parts to be in the operative relation shown in Fig. 1, with the upper magazine in use, and assuming, further, that another magazine is required to be brought into use, the operator first turns the throat-plate E backward clear of the magazines to either of the positions shown in Fig. 13. He next turns the disk $m''$ by means of the handle $m^{10}$ until the rocker-frames M and the contained magazines are rocked around pivots $l^2$ to the inclined position shown in Fig. 5, with their upper and lower ends out of connection with the coöperating parts. The disks also at the same time lift the arm $h^8$ and through the intermediate connections rock the frame $h'$, so as to lock the escapements in the magazine and disengage the actuating-rods H. The latch $o^8$ is then disengaged and the screw $o^4$ turned, thereby causing the arm $o$ to shift the slide-plates L forward, the slide-plates carrying with them the rocker-plates M and the magazines. The parts are stopped and locked in one position or another by the latch $o^8$, according as one magazine or another is required for use. The disks $m''$ are rotated in the reverse direction, causing the required magazine to assume its operative inclination and position and also causing the rods H to engage the escapements and the locking device to release them. The throat-plate E is then turned forward into position against the rear end of the magazine and the machine is ready for operation.

While the magazines are rigidly connected by and supported in the frame M, so that they constitute jointly a multiplex magazine, it is to be understood that any one of these magazines may be withdrawn endwise at will in a rearward direction and replaced by another.

While I have described my improvements as applied to a linotype-machine adapted to produce line-printing bars or linotypes, it is to be understood that it is applicable to all machines in which either matrices or dies are carried in magazines, whether used for the production of complete lines or for the production of logotypes or single type.

Having described my invention, what I claim is—

1. In a linotype-machine, plural magazines, facing in the same direction and mounted to move jointly forward and backward and also rock on a horizontal axis, whereby either one of the magazines may be brought into operative position at will.

2. In a linotype-machine, a sliding and rocking support, having a number of magazines mounted rigidly therein whereby any desired one of the magazines may be brought to the operative position at will without inversion.

3. In a linotype-machine, the combination of a main frame, supports mounted to slide forward and backward therein, a rocker-frame carried by said supports, and magazines rigidly mounted in the rocker-frame.

4. In a linotype-machine, a fixed distributing mechanism, a fixed mechanism to receive and assemble the released matrices, plural intermediate magazines, rigidly united and mounted to rock and also to shift bodily, whereby either magazine may be brought at will into operative relation to the other parts.

5. In a linotype-machine, a rigid main frame A, with its fixed track-plates K, in combination with the sliding plates L, sustained by the track-plates, the rocker-frame M, carried by the sliding plates, and a series of magazines fixed in the rocker-frame, whereby the adjustment of one magazine or another in operative position is permitted.

6. In combination with a series of rigidly-united magazines and the rocking and shifting supports therefor, means for shifting the supports to predetermined positions, whereby one magazine or another may be definitely placed to admit of its rocking into operative position.

7. In a linotype-machine, a magazine, a horizontal axis whereon the magazine is mounted to turn, said axis movable to different positions to permit change of location of the magazine, and means for positively turning the magazine on its axis in its different locations.

8. In a linotype-machine, plural magazines rigidly united and mounted to turn about an axis and also to move bodily, in combination with means for positively effecting the turning movement, and means for positively effecting the movement bodily.

9. In a linotype-machine, a series of magazines, each provided with escapement devices to control the release of the matrices, rocking and shifting supports permitting any one of the magazines to be brought into operative position, means for actuating the escapements of the operative magazine, and means for automatically disengaging said actuating devices preparatory to the shifting of a magazine.

10. In a linotype-machine, a magazine mounted to rock to and from its operative position and provided with escapements to control the discharge of the matrices, in combination with escapement-actuating devices, mounted in the main frame, and means for rocking the magazine and for automatically engaging and disengaging said actuating devices.

11. In a linotype-machine, a series of magazines, a rocker-frame M wherein they are rigidly secured, sliding supports for said rocker-frame, vibratory arms $o$ and connections therefrom to move the sliding supports, the screw $o^4$, the connections between the screw and the arm $o$, and the locking device $o^8$.

12. In a linotype-machine, the series of magazines, the rocker-frame wherein they are rigidly supported, sliding supports for said rocker-frame, and connections between the rocker-frame and the sliding supports to effect the positive tilting or rocking of the magazine.

13. The rocking magazine-support M and the sliding support therefor, in combination with the rotary disks $m''$, carried by the rocker-frame and adapted to engage the sliding frame, substantially as shown.

14. In combination with a sliding magazine-support L, having notches therein, and a rocking magazine-support carried thereby, the rotary disks or heads $m''$ carried by the rocking support and provided with studs to enter notches in the sliding support, whereby the positive rocking of the magazine is effected.

15. In a linotype-machine, the main frame, plural magazines facing in one direction, supporting devices permitting the magazines to be moved jointly forward and backward and also to be rocked about a horizontal axis, in combination with mechanisms for effecting said movements.

16. In combination with the magazines and the rocking and sliding supports therefor, the escapement-actuating rods, their movable guide, the arm $h^8$ connected with said guide, and disks $m''$, acting to rock the magazine-support and also to actuate the arms $h^8$ and thereby control the engagement and disengagement of the escapement-actuating rods.

17. In combination with the rocking magazines, shiftable forward and backward, the escapement-actuating rods, a movable guide therefor, and means substantially as shown for engaging and disengaging said rods and for holding them out of action during the shifting movement of the magazines.

18. In combination with magazines mounted on horizontal axes, pivotal supports, movable forward and backward, and means for positively locking said pivotal supports in different positions.

19. In combination with magazines, shiftable forward and backward, that one or another may be brought into operative position, a fixed distributer and an intermediate throat-plate or channel-entrance, movable supports to which said throat-plate is pivoted to turn rearward, and means for automatically shifting said support backward and forward as the throat-plate is turned on its pivot.

20. In a linotype-machine, the hinged throat-plate E, for guiding the matrices into the magazine, swinging arms $e$ to which said throat is pivoted, and connections between the throat and the main frame to effect the movement of the throat and its supports bodily backward and forward as it is turned to and from its operative position.

21. In combination with the throat-plate E, the swinging arms $e$ to which it is jointed, and the arm $e^{12}$ carried by the throat-plate and engaging the main frame, substantially as described and shown, whereby the throat-plate is caused to move bodily forward or backward in addition to its pivotal motion.

22. In combination with a movable magazine, the throat-plate, supports to which the throat-plate is hinged, said supports movably connected to the main frame, and a spring-actuated device U, to hold the throat-plate away from the magazine during movement of the latter.

23. In a linotype-machine, the combination of a magazine provided with escapements and a locking device therefor, rods for actuating the escapements and a movable guide for said rods, provided with means for actuating the escapement-locking device, whereby the disengagement of the rods and the locking of the escapements, and vice versa, may be effected as a single operation.

24. In combination with a magazine, its escapements, the locking-rod S with its crank-arm, the escapement-actuating rods H and their rocking support $h'$, having a hook T to actuate the locking device.

25. In a linotype-machine, the magazine and its escapement and the escapement-actuating rods H, in combination with the rocking guide $h'$ and a spring mechanism $l^{15}$, acting on said guide to keep the rods in engagement.

In testimony whereof I hereunto set my hand, this 5th day of November, 1904, in the presence of two attesting witnesses.

CARL L. GROHMANN.

Witnesses:
  Wm. C. O'Brien,
  Herman F. Voss.